United States Patent
Cha et al.

(10) Patent No.: US 11,631,281 B2
(45) Date of Patent: Apr. 18, 2023

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Jungmin Cha, Hwaseong-si (KR); TaeJun Kang, Incheon (KR); Chae Mo Yang, Gunpo-si (KR); Ikjun Choi, Hwaseong-si (KR); Do Youn Jang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 334 days.

(21) Appl. No.: 17/092,944

(22) Filed: Nov. 9, 2020

(65) Prior Publication Data

US 2022/0028183 A1    Jan. 27, 2022

(30) Foreign Application Priority Data

Jul. 21, 2020    (KR) .......................... 10-2020-0090088

(51) Int. Cl.
*G07C 5/00* (2006.01)
*G06N 20/00* (2019.01)
(Continued)

(52) U.S. Cl.
CPC .............. *G07C 5/004* (2013.01); *B60L 58/12* (2019.02); *G06N 20/00* (2019.01); *B60K 35/00* (2013.01);
(Continued)

(58) Field of Classification Search
None
See application file for complete search history.

(56) References Cited

U.S. PATENT DOCUMENTS

| 2013/0124077 A1* | 5/2013 | Kim ...................... B60W 40/13 701/123 |
| 2014/0005879 A1* | 1/2014 | Poechmueller ...... G01G 19/086 701/29.1 |

(Continued)

*Primary Examiner* — Navid Z. Mehdizadeh
(74) *Attorney, Agent, or Firm* — McDonnell Boehnen Hulbert & Berghoff LLP (57) ABSTRACT

A vehicle includes a power supply including a battery, a display, a storage configured to store a power matching data, and a fuel efficiency matching data, and a controller configured to determine driving power supplied by the battery, determine a current driving fuel efficiency corresponding to a reference weight based on the driving power and the power matching data, determine the current weight of the vehicle, determine a first fuel efficiency based on an accumulated driving fuel efficiency accumulated from a previous charging time point to a current charging time point and the current driving fuel efficiency at the current charging time point, determine a second fuel efficiency based on the fuel efficiency matching data and the first fuel efficiency corresponding to each of the existing weight and the current weight, determine the estimated driving distance of the vehicle based on the charging capacity of the battery and the second fuel efficiency, and output the estimated driving distance to the display.

6 Claims, 6 Drawing Sheets

(51) Int. Cl.
  *B60L 58/12*      (2019.01)
  *B60K 35/00*      (2006.01)
(52) U.S. Cl.
  CPC .. *B60K 2370/169* (2019.05); *B60K 2370/178* (2019.05)

(56) References Cited

U.S. PATENT DOCUMENTS

| | | | | |
|---|---|---|---|---|
| 2016/0023554 | A1* | 1/2016 | Tseng | B60K 6/48 |
| | | | | 701/22 |
| 2016/0061610 | A1* | 3/2016 | Meyer | B60L 58/12 |
| | | | | 701/22 |
| 2016/0097652 | A1* | 4/2016 | Liu | G01C 21/3469 |
| | | | | 701/423 |
| 2016/0129918 | A1* | 5/2016 | Skaff | B60W 50/14 |
| | | | | 340/455 |
| 2018/0029500 | A1* | 2/2018 | Katanoda | G01C 21/3469 |
| 2018/0257666 | A1* | 9/2018 | Bryan | B60H 1/00385 |
| 2020/0226850 | A1* | 7/2020 | Bower | B60Q 9/00 |
| 2021/0012584 | A1* | 1/2021 | Saavedra Román | |
| | | | | G01C 21/3492 |

* cited by examiner

VEHICLE AND CONTROL METHOD THEREOF

CROSS REFERENCE TO RELATED APPLICATIONS

This application is based on and claims priority under 35 U.S.C. § 119 to Korean Patent Application No. 10-2020-0090088, filed on Jul. 21, 2020 in the Korean Intellectual Property Office, the disclosure of which is incorporated herein by reference.

BACKGROUND

1. Technical Field

The disclosure relates to a vehicle for determining a distance to empty according to the weight of the vehicle, and a control method thereof.

2. Description of the Related Art

In the case of an electric vehicle capable of loading cargo or attaching a trailer, the total weight of the vehicle increases significantly. Accordingly, the accuracy of predicting the distance to empty may decrease due to an increase in driving resistance.

In other words, the situation of adding a cargo weight to the existing fuel economy value has not been considered in predicting the driving distance of an electric vehicle. On the other hand, the distance to empty accuracy may be reduced by reflecting the past fuel efficiency (Km/Kwh) in which the cargo was not added or subtracted during the calculation of the distance to empty of an electric vehicle.

In particular, in the case of trucks that frequently load and unload cargo, consumer dissatisfaction may increase due to an error in predicting the distance to empty.

Therefore, in the case of electric vehicles, when the vehicle weight itself is changed, a technology for deriving an accurate estimated driving distance is required.

SUMMARY

Therefore, it is an aspect of the disclosure to provide a vehicle for preventing a situation in which the vehicle cannot be driven by determining an accurate distance to empty even when the vehicle weight is changed, and a control method thereof.

In accordance with one aspect of the disclosure, a vehicle includes a power supply including a battery, a display, a storage configured to store a power matching data including a relationship between a driving consumption power and a weight, and a fuel efficiency (Km/Kwh) matching data including a relationship between a fuel efficiency and a weight, and a controller configured to determine driving power supplied by the battery, determine a current driving fuel efficiency corresponding to a reference weight based on the driving power and the power matching data, determine the current weight of the vehicle, determine a first fuel efficiency based on an accumulated driving fuel efficiency accumulated from a previous charging time point to a current charging time point and the current driving fuel efficiency at the current charging time point, determine a second fuel efficiency based on the fuel efficiency matching data and the first fuel efficiency corresponding to each of the existing weight and the current weight, determine the estimated driving distance of the vehicle based on the charging capacity of the battery and the second fuel efficiency, and output the estimated driving distance to the display.

The controller may be configured to determine the driving power based on a difference between a supply power supplied by the battery and an air conditioning consumption power consumed by the air conditioning device included in the vehicle.

The controller may be configured to determine the accumulated driving fuel efficiency accumulated from the previous charging time point to the current charging time point and, based on a driving distance and an amount of charge of the battery from the previous charging time point to the current charging time point, determine the first fuel efficiency based on a weight value corresponding to each of the accumulated driving fuel efficiency and the current driving fuel efficiency at the current charging time point.

The controller, based on a momentum change of the vehicle and an existing weight of the vehicle, may be configured to determine the current weight determined by the sum of the existing weight of the vehicle and the load weight.

The storage may be configured to store the fuel efficiency matching data including a plurality of fuel efficiencies corresponding to each of the existing weight and the current weight.

The vehicle may further include an air conditioning device, and the controller may be configured to determine the estimated driving distance of the vehicle based on a charging capacity of the power supply, the second fuel efficiency, and a power consumed by the air conditioning device.

The controller may be configured to determine the estimated driving distance of the vehicle based on a charging capacity of the power supply, the second fuel efficiency, and a power consumed by the air conditioning device.

The controller may be configured to perform an update operation of the estimated driving distance of the vehicle when the load weight exceeds a predetermined reference weight.

The controller may be configured to control to output a change alarm of the estimated driving distance of the vehicle to the display when the load weight exceeds a predetermined reference weight.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Like numerals refer to like elements throughout the specification. Not all elements of embodiments of the disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, identify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it will be understood that, when a member is referred to as being "on/under" another member, it can be directly on/under the other member, or one or more intervening members may also be present.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the disclosure will be described with reference to the accompanying drawings.

Figure 1:
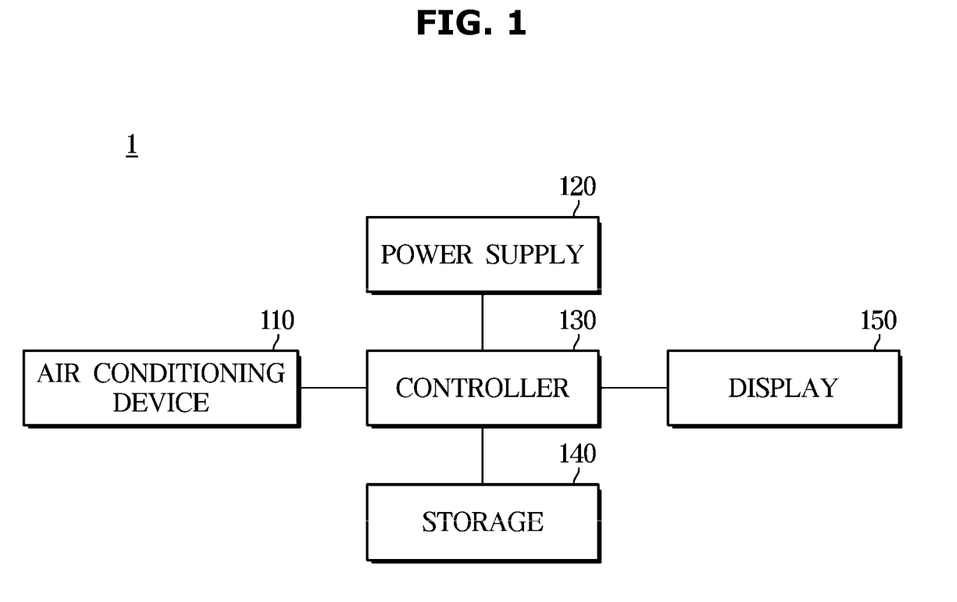
FIG. 1 is a control block diagram according to an embodiment.

FIG. 1 is a control block diagram according to an embodiment.

Referring to FIG. 1, a vehicle according to an embodiment may include a power supply 120, a display 150, a storage 140, and a controller 130.

The power supply 120 may be provided as an element that supplies power to the vehicle. According to an embodiment, the power supply may include at least one battery.

The display 150 may output the remaining driving distance of the vehicle. According to an embodiment, the display may be provided as an AVN of a vehicle or a display included in a cluster.

The storage 140 may be provided with at least one memory.

The storage 140 may store power matching data including a relationship between driving consumption power and weight, and fuel efficiency (Km/Kwh) matching data including a relationship between fuel efficiency (Km/Kwh) and weight.

Fuel efficiency (Km/Kwh) may mean the distance a vehicle travels per unit power.

The power matching data may mean data including power required for driving a vehicle corresponding to the weight of the vehicle.

Meanwhile, the fuel efficiency (Km/Kwh) matching data may mean data including the fuel efficiency of the vehicle corresponding to the weight of the vehicle.

Fuel efficiency (Km/Kwh) may mean the distance traveled per unit power.

Meanwhile, the matching data may be formed in the form of a conversion table, but there is no limitation on the form of data.

The storage 140 may include non-volatile memory element such as cache, read only memory (ROM), programmable ROM (PROM), erasable programmable ROM (EPROM), electrically erasable programmable ROM (EEPROM), and flash memory or a volatile memory element such as random access memory (RAM), or a storage medium such as a hard disk drive (HDD) or a CD-ROM. The type of storage is not limited to that illustrated. The storage 140 may be a memory implemented as a separate chip from the processor described above with respect to the controller 130, or may be implemented as a single chip together with a processor.

The controller 130 may determine driving power supplied by a battery included in the power supply.

The driving power is power required for driving of the vehicle, and may be determined as a difference between the power supplied by the battery and the power consumed by other devices.

The controller 130 may determine the reference power consumption corresponding to the reference weight based on driving consumption power and power matching data.

The controller 130 may determine the first fuel efficiency based on the current driving fuel efficiency accumulated from the previous charging time point to the current charging time point.

The first fuel efficiency may mean a driving distance of a vehicle per unit power in a reference weight. The controller 130 may determine the second fuel efficiency based on the first fuel efficiency and fuel efficiency matching data corresponding to each of the existing weight and the current weight.

Specifically, the controller 130 may match the fuel efficiency matching data stored in the storage 140 with a reference weight, and may determine the second fuel efficiency based on a relationship between the current weight and the reference weight.

Specifically, the current weight may mean a value obtained by adding the load weight to the existing weight of the vehicle.

Meanwhile, the controller 130 may determine the estimated driving distance of the vehicle based on the charging capacity and second fuel efficiency of the power supply 120 and output it to the display 150.

The controller 130 may determine the first fuel efficiency based on a driving distance before the current charging time point, the accumulated driving fuel efficiency of the vehicle, and a driving distance per unit power at the current charging time point.

The controller 130 may determine driving consumption power required for driving the vehicle based on the difference between the battery consumption power supplied by the battery and the air conditioning consumption power consumed by the air conditioning device included in the vehicle.

The controller 130 may determine accumulated driving fuel efficiency accumulated from a previous charging time point to a current charging time point.

In addition, the controller 130, based on the driving distance from the charging time point to the reference time point and the amount of charge of the battery, may determine the first fuel efficiency based on a weight value corresponding to each of the accumulated driving fuel efficiency and the current driving fuel efficiency at the current charging time point. A detailed description of this will be described later.

The controller 130 may determine a current weight determined as the sum of the existing weight and the load weight of the vehicle based on the vehicle's momentum change.

Specifically, the controller 130 may determine the weight by comparing the amount of impact transmitted to the vehicle by the driving force and the load weight of the vehicle and the momentum change of the vehicle.

Specifically, the current weight obtained by adding the load weight to the existing weight may be determined by the following equation.

$$m = \frac{\int_{t_0}^{t_1}\left[\frac{\eta_{RD}}{r_{tire}}(\tau_{Mot}^{BeAj}) - (f_0 + f_1 v + f_2 v^2)\right]dt}{\left[\Delta v + \int_{t_0}^{t_1} g\sin\theta dt\right]}$$ Equation 1

Referring to Equation 1, m denotes a current weight, $\eta_{RD}$ denotes a reducer efficiency, $\tau^{BeAj}_{Mot}$ denotes a torque of a motor, $r_{tire}$ denotes a tire dynamic radius, and $f_0$, $f_1$, and $f_2$ may each denote a connected driving load.

The controller 130 may use weight modeling using the driving force and gradient of the vehicle as shown in Equation 1.

The controller may set the weight in consideration of driver manipulation (APS/BPS) and wheel slip as a condition to activate the estimation logic.

The controller 130 may continuously update the current weight through weight verification.

Specifically, it is possible to determine the amount of change in the minimum and maximum values of the updated current weight, and based on this, determine the current weight to which the load weight is added to the weight of the existing vehicle.

In addition, the controller 130 may minimize the error by differentiating the limit of the amount of change in the weight at the time of the first update starting after stopping without changing the weight while driving and at the time of the subsequent update.

The storage 140 may store matching data including a plurality of unit driving distances corresponding to each of the existing weight and the current weight.

The controller 130 may determine the second unit driving distance by changing the first unit driving distance based on the ratio of each of the plurality of units of driving distances included in each of the matching data.

A vehicle according to an embodiment may further include an air conditioning device 110.

The air conditioning device 110 may mean all devices that control heating, ventilation, and air of a vehicle.

The controller 130 may determine the estimated driving distance of the vehicle based on the charging capacity of the power supply 120, the second fuel efficiency and the power consumed by the air conditioning device 110.

In detail, the controller 130 may determine the estimated driving distance by determining the power consumed by the air conditioning device 110 and reflecting this to the charging capacity of the power supply 120.

The controller 130 may determine the estimated driving distance of the vehicle based on the charging capacity of the power supply 120, the second fuel efficiency, and the power consumed by the display 150.

That is, the controller 130 may determine the power consumed by the display 150 and reflect this to the charging capacity of the power supply 120 to determine the estimated driving distance.

When the load weight exceeds a predetermined reference weight, the controller 130 may perform an update operation of the estimated driving distance of the vehicle. That is, the weight of the vehicle may change, and the controller 130 may determine that the weight of the vehicle has changed when a load weight of a predetermined size or more is combined with the existing vehicle and calculate the unit driving distance again.

Meanwhile, at this time, when the load weight exceeds a predetermined reference weight, the controller 130 may control to output a change alarm of estimated driving distance of the vehicle to the display 150.

Specifically, when the load weight exceeds a predetermined reference weight, the controller 130 performs an operation of recalculating the driving distance, and at this time, the controller 130 may output a change alarm of estimated driving distance to the display 150.

The controller 130 may be implemented as a memory (not shown) that stores an algorithm for controlling the operation of components in a vehicle or a data about a program that reproduces the algorithm, and a processor (not shown) that performs the above-described operation using data stored in the memory. In this case, the memory and the processor may be implemented as separate chips, respectively. Alternatively, the memory and processor may be implemented as a single chip.

Figure 2:
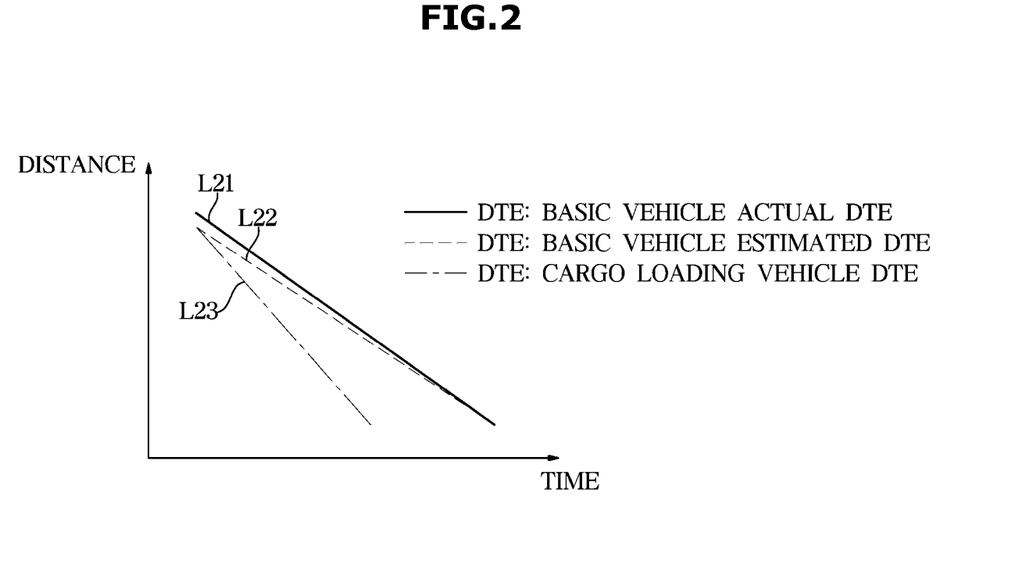
FIG. 2 is a graph illustrating an estimated driving distance corresponding to a change in weight of a vehicle according to an embodiment.

FIG. 2 is a graph illustrating an estimated driving distance corresponding to a change in weight of a vehicle according to an embodiment.

Referring to FIG. 2, the distance to empty over time is shown for each vehicle. Specifically, FIG. 2 shows the actual distance to empty L21 of the basic vehicle, the estimated distance to empty L22 of the vehicle, and the distance to empty L23 of the cargo loading vehicle.

Referring to FIG. 2, compared to a general vehicle, in the case of a cargo loading vehicle, the total weight of the vehicle is greatly increased, and accordingly, the driving resistance increases, so that the prediction accuracy of the distance to empty may decrease.

On the other hand, there is no consideration for the situation in which the loading amount or load weight is added to the fuel efficiency value for predicting the distance to empty of the existing vehicle.

The accuracy of distance to empty may be reduced by reflecting the past fuel efficiency in which the load was not added or subtracted during the prediction calculation of distance to empty by the controller 130.

Accordingly, in the present disclosure, an operation of increasing the accuracy of the distance to empty of the above-described cargo loading vehicle, that is, an electric vehicle capable of loading cargo will be described in detail.

Figure 3:
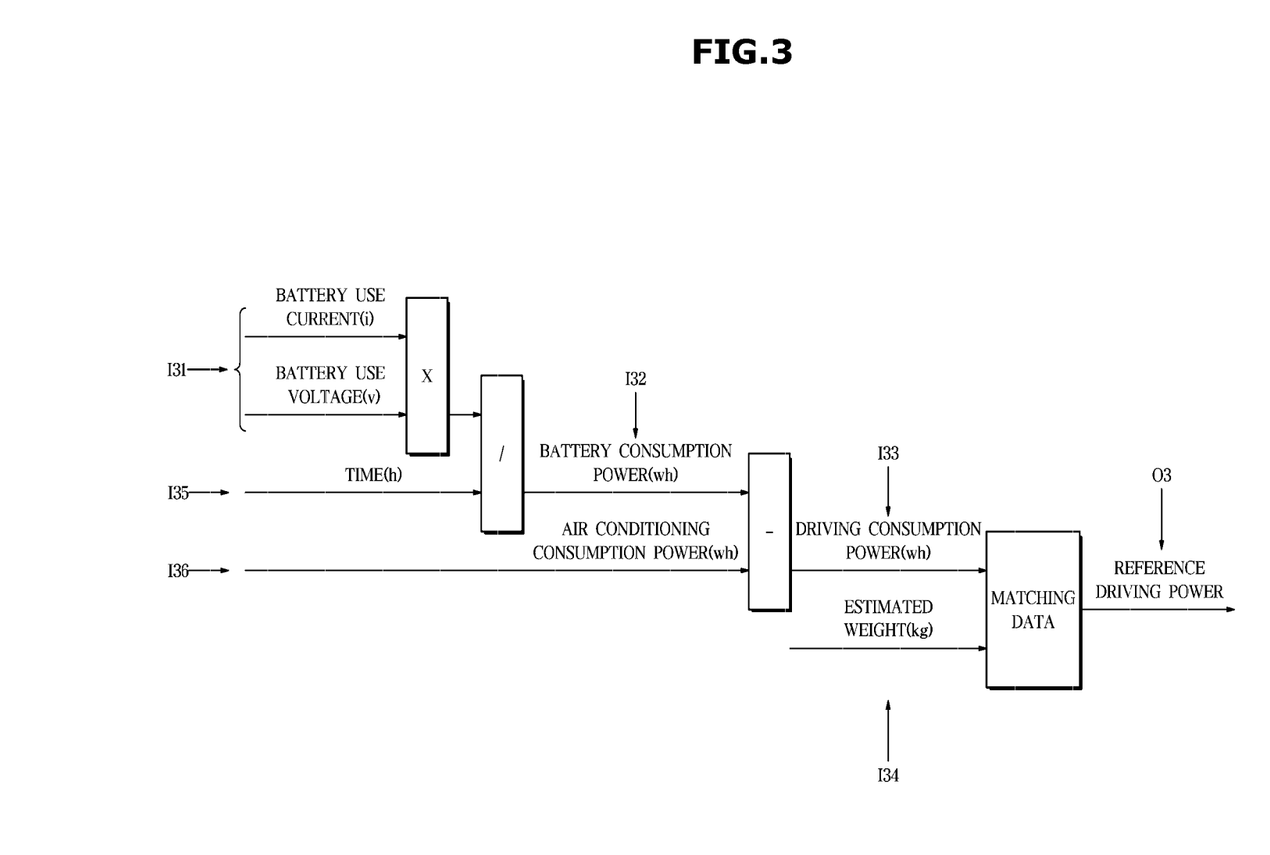
FIG. 3 is a diagram illustrating an operation of determining a first unit driving distance based on a driving distance and power consumption of the vehicle up to a reference time point according to an embodiment.

FIG. 3 is a diagram illustrating an operation of determining power consumption of an existing vehicle at a reference time point and power consumption of a current vehicle according to an embodiment.

Referring to FIG. 3, the controller 130 may learn accumulated fuel efficiency by changing the driving consumption power (Wh) according to the weight of the vehicle to the tolerance or driving consumption power (Wh) of a specific weight level when learning accumulated fuel efficiency.

Specifically, the controller 130 may receive the use current and use voltage I31 of the battery. Meanwhile, the controller 130 may use the time information I35.

The controller 130 may determine the consumed battery consumption power I32 output by the power supply 120 based on this. The controller 130 may also consider the air conditioning consumption power I36 used by the air conditioning device 110 at this time.

Specifically, the controller may determine driving consumption power I33 based on a difference between battery consumption power and air conditioning consumption power.

The controller 130 may finally determine the driving consumption power I33 based on the above-described operation.

In addition, the controller 130 may derive the derived driving consumption power I33 and the current mass value I34 determined based on the above-described operation as consumed power used in a specific weight, that is, a reference consumed power O3 by using matching data stored in storage 140.

According to an embodiment, the specific weight may mean the mass of the current vehicle after the above-described reference time point.

For example, the controller 130 may determine the existing weight of the vehicle based on 2000 kg, calculate the current consumption power based on the tolerance, and learn the past fuel efficiency.

The controller 130 may determine driving consumption power obtained by calculating all of the current, voltage, air conditioning consumption power currently being used based on the current mass of 2750 kg. This case may mean a case where the load mass is determined to be 750 kg.

In addition, the controller 130 may convert the driving consumption power into the current driving consumption power of the current weight by applying power matching data and use it to determine the above-described fuel efficiency.

Meanwhile, the operation of the present disclosure described in FIG. 3 is only an embodiment, and there is no limitation on the operation of determining the power consumption of the current weight combined with the load weight by using the weight and power consumption of the existing vehicle.

Figure 4:
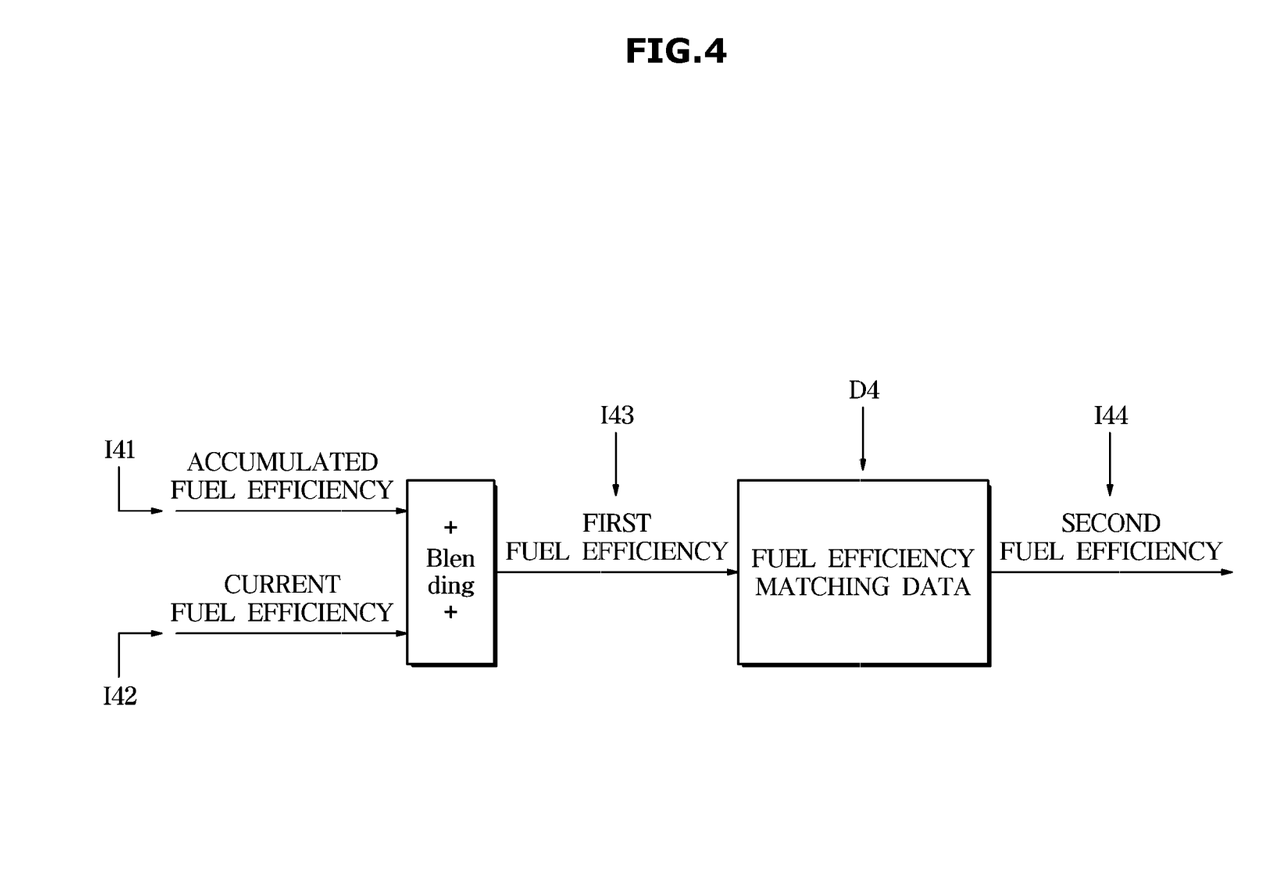
FIG. 4 is a diagram illustrating an operation of determining a second unit driving distance based on matching data and a first unit driving distance corresponding to each of the existing weight and the current weight.

FIG. 4 is a diagram illustrating an operation of determining a second fuel efficiency based on fuel efficiency matching data and first fuel efficiency corresponding to each of the existing weight and current weight.

The controller may determine the accumulated fuel efficiency accumulated from the previous charging time point to the current charging time point based on the reference weight (I41).

For example, the controller may continuously accumulate driving consumption power of several time points while driving.

Meanwhile, the controller may determine the accumulated driving distance, driving consumption power according to the reference mass, and a learning buffer for learning. Based on this, the controller may determine the current fuel efficiency at the reference time point (I41).

The controller 130 may determine the accumulated fuel efficiency by determining the accumulated driving distance per accumulated driving consumption power based on a specific weight of the vehicle (I41).

The current unit driving distance based on the reference weight may be sequentially stored in the buffer of the controller 130 when the vehicle is charged, so that the accumulated fuel efficiency may be learned.

The controller 130 may determine the first fuel efficiency (I43) by using the learned accumulated fuel efficiency (I41) and the current fuel efficiency (I42) based on the current weight at a predetermined ratio based on the driving distance and consumed SOC.

The controller may determine the second fuel efficiency (I44) based on the fuel efficiency matching data (D4) and first fuel efficiency corresponding to each of the existing weight and the current weight.

The above-described first fuel efficiency may be determined by Equation 2 below (I43).

$$L1 = ((1 - U_{blend}) \times P1 + U_{blend} \times P2) \quad \text{Equation 2}$$

Referring to Equation 2, L1 denotes first fuel efficiency, $U_{blend}$ denotes a ratio of reflecting the current unit driving distance, and P1 denotes accumulated driving fuel efficiency.

Also, P2 denotes the current driving fuel efficiency.

$U_{blend}$, that is, the ratio of reflecting the current unit driving distance is the ratio of the driving distance and the SOC consumed after charging, and a factor that may determine the ratio of reflecting the past and present fuel efficiency.

Meanwhile, $U_{blend}$ refers to an element that determines a weight value corresponding to each of the accumulated driving fuel efficiency and the current driving fuel efficiency at the reference time point by the controller 130.

The controller may use fuel efficiency matching data D4 stored in the storage 140 to determine the second fuel efficiency.

Finally, the controller 130 may determine the distance to empty of the vehicle by comparing the second fuel efficiency I44 determined based on the above-described operation with the capacity currently charged in the power supply 120.

Meanwhile, the above-described operation is only an embodiment of the present disclosure, and there is no limitation on the operation of determining the distance to empty of the vehicle based on the second fuel efficiency.

Figure 5:
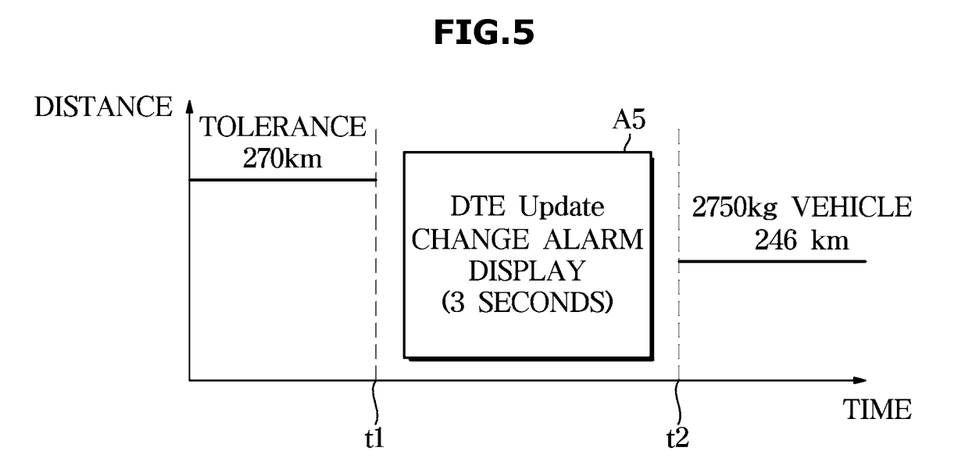
FIG. 5 is a diagram illustrating a time point for determining an estimated driving distance according to an embodiment.

FIG. 5 is a diagram illustrating a time point for determining an estimated driving distance according to an embodiment.

Referring to FIG. 5, when the load mass is coupled to the vehicle, the controller 130 may immediately update the distance to empty to provide accurate information to the driver.

FIG. 5 shows that the existing vehicle is combined with the load mass at the t1 time point.

Meanwhile, at this time point, the controller 130 may output (A5) the change alarm of the estimated driving distance of vehicle.

Specifically, when the vehicle and the load mass are combined at the t1 time point, the controller 130 may output the change alarm of the estimated driving distance on the display 140.

The controller 130 may determine the changed distance to empty based on the weight of the vehicle changed between t1 and t2 time points.

The controller 130 may output the changed distance to empty on the display 150.

Meanwhile, the operation described in FIG. 5 is only an embodiment of the present disclosure, and there is no limitation on the operation of outputting the change alarm of the estimated driving distance.

Figure 6:
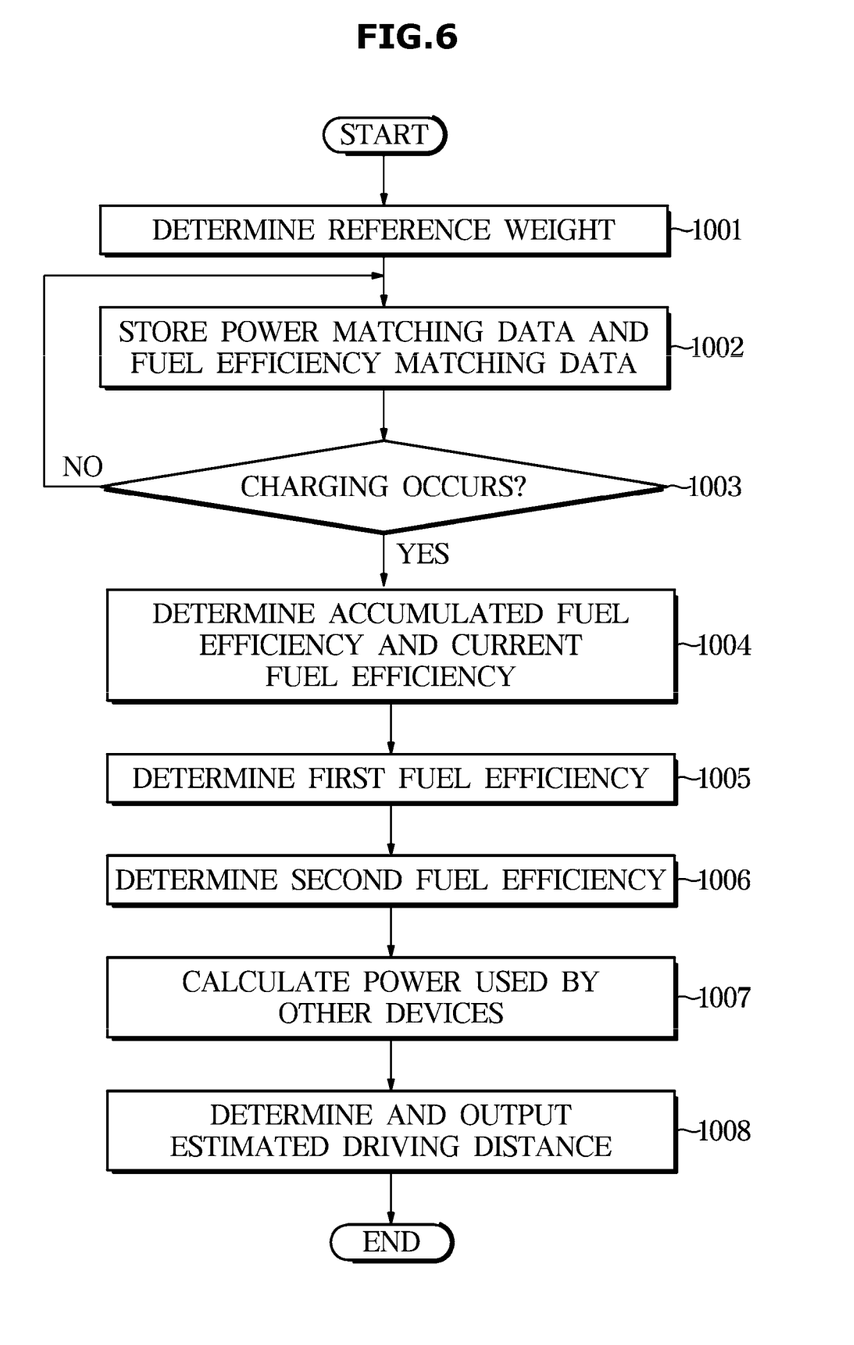
FIG. 6 is a flow chart according to an embodiment.

FIG. 6 is a flow chart according to an embodiment.

Referring to FIG. 6, the controller may determine a reference weight at 1001. According to an embodiment, the reference weight may mean a mass for the controller to learn fuel efficiency.

In addition, the controller may store power matching data and fuel efficiency matching data according to mass at 1002.

Meanwhile, when charging occurs in the vehicle at 1003, accumulated fuel efficiency and current fuel efficiency based on the reference mass from the previous charging time point to the current charging time point may be determined at 1004.

The first fuel efficiency may be determined in consideration of a weight value corresponding to each of the accumulated fuel efficiency and the current fuel efficiency at 1005. As described above, the weight value corresponding to the accumulated fuel efficiency and the current fuel efficiency may be determined based on the charging capacity of the battery and the driving distance.

The first fuel efficiency determined based on the reference mass may be determined as the second fuel efficiency corresponding to the mass of the current vehicle based on the fuel efficiency matching data at 1006.

The controller 130 may calculate the power used by other devices such as air conditioning devices and displays at 1007.

The controller 130 may determine the estimated driving distance of the vehicle in consideration of the power used by other devices from the power output from the battery and output it to the display at 1008.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

Although exemplary embodiments of the disclosure have been described for illustrative purposes, those skilled in the art will appreciate that various modifications, additions and substitutions are possible, without departing from the scope and spirit of the disclosure. Therefore, exemplary embodiments of the disclosure have not been described for limiting purposes.

The vehicle and control method thereof according to an embodiment may prevent a situation in which the vehicle cannot be driven by determining an accurate distance to empty even when the vehicle weight is changed.

The invention claimed is:

1. A vehicle comprising:
   a power supply comprising a battery;
   a display;
   a storage configured to store:
      a power matching data indicating power necessary for driving the vehicle, corresponding to a weight of the vehicle;
      a fuel efficiency matching data indicating fuel efficiency of the vehicle, corresponding to the weight of the vehicle; and
   a controller comprising a processor configured to:
      determine a current weight of the vehicle by summing a reference weight of the vehicle and a load weight based on a momentum change of the vehicle;
      determine a current driving power based on a difference between a supply power supplied by the battery and an air conditioning consumption power consumed by an air conditioning device of the vehicle;
      determine a current driving fuel efficiency corresponding to the reference weight of the vehicle based on the current driving power and the power matching data;
      determine a first fuel efficiency based on a value obtained by reflecting a weight value to each of an accumulated driving fuel efficiency accumulated from a previous charging time point to a current charging time point and the current driving fuel efficiency at the current charging time point;
      determine the weight value based on a current unit driving distance that is a ratio of a driving distance and a consumed amount of the battery;
      determine a second fuel efficiency corresponding to the current weight of the vehicle based on the fuel efficiency matching data and the first fuel efficiency;
      determine an estimated driving distance of the vehicle based on a charging amount of the battery and the second fuel efficiency; and
      output the estimated driving distance to the display.

2. The vehicle according to claim 1, wherein the storage is configured to store the fuel efficiency matching data comprising a plurality of fuel efficiencies corresponding to each of the reference weight of the vehicle and the current weight of the vehicle.

3. The vehicle according to claim 1,
   wherein the controller is configured to determine the estimated driving distance of the vehicle based on the charging amount of the battery, the second fuel efficiency, and the air conditioning consumption power consumed by the air conditioning device of the vehicle.

4. The vehicle according to claim 1, wherein the controller is configured to determine the estimated driving distance of the vehicle based on the charging amount of the battery, the second fuel efficiency, and a power consumed by the display.

5. The vehicle according to claim 1, wherein the controller is configured to perform an update operation of the estimated driving distance of the vehicle when the load weight exceeds a predetermined reference weight.

6. The vehicle according to claim 5, wherein the controller is configured to control to output a change alarm of the estimated driving distance of the vehicle to the display when the load weight exceeds the predetermined reference weight.

* * * * *